US007826418B2

(12) United States Patent
Babbar et al.

(10) Patent No.: US 7,826,418 B2
(45) Date of Patent: Nov. 2, 2010

(54) BLOCK-BASED ASSIGNMENT OF QUALITY OF SERVICE PRECEDENCE VALUES

(75) Inventors: Uppinder Singh Babbar, San Diego, CA (US); Marcello Lioy, San Diego, CA (US); Venkata Satish Kumar Vangala, Longmont, CO (US)

(73) Assignee: Qualcomm Incorporated, San Diego, CA (US)

( * ) Notice: Subject to any disclaimer, the term of this patent is extended or adjusted under 35 U.S.C. 154(b) by 1128 days.

(21) Appl. No.: 11/354,395

(22) Filed: Feb. 14, 2006

(65) Prior Publication Data

US 2006/0291449 A1 Dec. 28, 2006

Related U.S. Application Data

(60) Provisional application No. 60/694,724, filed on Jun. 27, 2005.

(51) Int. Cl.
H04W 28/00 (2009.01)
H04W 72/00 (2009.01)
(52) U.S. Cl. .................... 370/329; 370/395.42; 455/450
(58) Field of Classification Search ............ 370/395.42, 370/235, 329, 395.4; 709/240; 455/450–454
See application file for complete search history.

(56) References Cited

U.S. PATENT DOCUMENTS 6,128,713 A * 10/2000 Eisler et al. ................. 711/159
6,822,940 B1 * 11/2004 Zavalkovsky et al. ....... 370/237

2003/0012220 A1 1/2003 Kim et al.
2005/0226235 A1 * 10/2005 Kumar et al. ............... 370/386
2007/0192507 A1 * 8/2007 DiBiasio et al. ............. 709/238

FOREIGN PATENT DOCUMENTS

WO WO 0163855 A1 8/2001

OTHER PUBLICATIONS

Bilgic et al., "Quality of Service in General Packet Radio Service", Mobile Multimedia Communications, Nov. 15, 1999, pp. 226-231, XP101370727, MOMUC, Piscataway, NJ, USA.
International Search Report and Written Opinion - PCT/US2006/025096, International Search Authority - European Patent Office - Mar. 12, 2007.

* cited by examiner

Primary Examiner—Jayanti K Patel
Assistant Examiner—Matthew Campbell
(74) Attorney, Agent, or Firm—George Pappas; Eric Ho

(57) ABSTRACT

An ordered list of precedence values includes a number of blocks of precedence values. An operating system receives filters from an application. The operating system assigns a precedence value to each filter from the available block of precedence values that has the highest priority. Precedence values are assigned to maintain a precedence order specified by the application. Filters and their assigned precedence values are communicated to an entity that filters packets by applying the filters in the order of their precedence values. Filters for an application can be added, deleted, or modified without affecting the precedence values of other filters for other applications. If an assignment is to be made when the lowest priority block is not available, then a repacking operation is performed to fill unused blocks in the list. The repacking is performed to reduce signaling associated with communicating reassigned precedences values to the filtering entity.

23 Claims, 5 Drawing Sheets

REPACKING OPERATION
(TOTAL REPACK TO FILL ALL HOLES)

REPACKING OPERATION
(TOTAL REPACK TO FILL ALL HOLES)

BLOCK-BASED ASSIGNMENT OF QUALITY OF SERVICE PRECEDENCE VALUES

CLAIM TO PRIORITY

This application claims priority to U.S. Provisional Patent Application No. 60/694,724, filed Jun. 27, 2005.

BACKGROUND

1. Field

The disclosed embodiments relate generally to the use of quality of service on mobile communication devices.

2. Background Information

Cellular telephones are no longer just used to communicate voice information, but rather are mobile computer platforms that have operating systems and application programs. One such application may, for example, be a streaming audio application that allows a user of a cellular telephone to listen to audio that is received from a server on the internet. Another such application may, for example, be a voice over IP (VoIP) application that allows voice information to be communicated in IP packets across a packet switched network. Icons representing multiple application programs are often presented to the user on the display of the cellular telephone. To launch a desired application, the user can click on the icon of the desired application. Multiple such application programs can be running at the same time. Conventionally, each of the application programs does not have a given amount of network resources such as bandwidth and latency allocated to it. If there are adequate network resources available for an application program, then the application will run in a satisfactory manner. If adequate network resources are not available, then the application program may not operate satisfactorily. One application can consume such a high level of network resources (for example, over-the-air channel bandwidth, RF power) that operation of the application is adversely affected.

To ensure that an application on a mobile communication device receives an adequate level of network resources, a mechanism is now being employed for specifying a Quality of Service (QOS) for IP traffic. An application executing on a mobile communication device "requests a QOS" so that network resources will be dedicated for use by the application so that the application can run in a well-behaved manner. Using QOS allows a finite amount of network resources to be allocated to multiple different applications. An application typically requests a QOS by issuing a "filter specification" and a "flow specification." The filter specification indicates how to identify a packet that belongs to a flow that is to receive the QOS identified by the flow specification. A filter specification may, for example, specify packets by specifying ranges of values in certain fields of the headers of the packets. If the specified fields have values in the ranges specified by the filter, then the packet is defined to be in the flow. In general, any protocol or application specific header can be among the parameters used to specify a filter specification. The flow specification specifies the QOS to be provided to the flow. The flow specification typically specifies an amount of latency required and a data rate required for packets that meet the filter specification.

To obtain a desired amount of network resources, a "QOS aware" application executing on the mobile communication device supplies a filter or filters to the protocol processing stack of the operating system executing on the mobile communication device. The stack of the operating system sends each filter along with a precedence value to the operating system in the network router. If the cellular network is a CDMA network, then the network router is typically a PDSN (Packet Data Serving Node) router. If the cellular network is a W-CDMA or GPRS network, then the network router is typically a GGSN (GPRS Gateway Serving Node) router. The filters and precedence values are sent from the mobile communication device to the network router using over-the-air protocols. Over-the-air signaling protocols for specifying filters and precedence values are specified for the particular type of wireless network employed. For example, the 3GPP (Third Generation Partnership Project) standards body has defined protocols for specifying filters and precedence values for WCDMA and GSM and GPRS networks. The 3GGP2 (Third Generation Partnership Project #2) standard body has defined protocols for specifying filters and precedence values for CDMA 2000 and CDMA EV-DO networks.

The network router receives the filters and precedence values and then associates each filter with a channel. In one example, the mobile communication device forwards the flow specification to the network router. The network router determines which one of multiple communication channels will be employed to communicate packets that match the filter back to the mobile communication device such that the QOS parameters in the flow specification are met. An incoming packet is compared to the filter with the highest precedence (highest priority). If the packet matches the filter, then the packet is sent to the mobile communication device using the communication channel associated with the filter. If the incoming packet does not match the highest precedence filter, then the network router compares the packet to the filter with the next highest precedence. The filters are therefore applied in order of their precedence values.

Similarly, there may be a list of filters used for the transmission of packets from the mobile communication device to the network through the network router. The application running on the mobile communication device supplies the filter specification and flow specifications to the operating system of the mobile communication device. Each filter has a unique precedence value assigned to it. The operating system associates each filter with a communication channel for communicating packets from the mobile communication device to the network router. When a packet is received from an application, the operating system of the mobile communication device checks the packet against the filters. If the packet matches a filter, then the packet is forwarded to the network router using the channel associated with the filter.

An application program can specify multiple filters associated with the same or different flow specification for use by the network router. In some situations, the filters specified by the same application for different flow specifications or filters specified by different applications for different flow specifications are overlapping (the same packets match both filters). Below is an example of two overlapping filters for incoming packets.

TABLE 1

| Family | Src IP Addr | Dest IP Addr | Protocol | Src Port | Dest Port |
|---|---|---|---|---|---|
| First Application Rx Filter Spec | | | | | |
| V4 | 10.1.2.3 | 10.2.3.4 | TCP | 150 | 0 |
| V4 | 10.1.2.3 | 10.2.3.4 | TCP | 500 | 0 |
| Second Application Rx Filter Spec | | | | | |
| V4 | 10.1.2.3 | 10.2.3.4 | TCP | 100-200 | 0 |

The first filter of the first filter specification passes any packet that has a TCP source port of 150. The Destination Port of 0 in the filter is a wildcard and matches any values. The filter in the second filter specification passes any packet with a TCP source port from 100 to 200. The network router applies the two filters one by one in order of the precedence values of the filters until a match is found. Below is one order of filters.

TABLE 2

| Family | Src IP Addr | Dest IP Addr | Protocol | Src Port | Dest Port | Precedence | Physical Channel |
|---|---|---|---|---|---|---|---|
| V4 | 10.1.2.3 | 10.2.3.4 | TCP | 150 | 0 | 1 | Channel 1 |
| V4 | 10.1.2.3 | 10.2.3.4 | TCP | 500 | 0 | 2 | Channel 1 |
| V4 | 10.1.2.3 | 10.2.3.4 | TCP | 100-200 | 0 | 3 | Channel 2 |

If there is a match for the first filter specification, then the packet is for the first application, and the packet is forwarded using channel 1. If there is a match for the second filter specification, then the packet is for the second application and is forwarded using channel 2. Because the packet that has a TCP source port of 150 can match both the first and second filter specifications, a different communication channel may be used depending on which filter specification is applied first.

In one example, the operating system of the mobile communication device assigns filter precedence by the order in which applications set up the filters. The first application to specify a filter is assigned the highest priority. The next application to specify a filter is assigned the next highest priority, and so forth. Applications can, however, be launched at any time and in different orders. The order of the launching of applications therefore varies, and this affects the precedence values of filters as communicated to the network router. If the filters are applied in different orders, then the QOS extended to the various applications will be different. This may be undesirable.

Moreover, an application can change its filters. For example, the streaming audio application described above may be receiving streaming audio via the router from a first server on the internet. The application then learns that it is then to switch to receiving audio content from a different server. To do this, the application can modify its existing filters in what is called a "QOS modification procedure" so that matching packets are now packets that originated from the second server and not the first server. In this way, either the flow specification or the filter specification, or both can be changed. When a filter is changed, if the precedence value of the filter changes, then the QOS extended to the application may change. Again, such a change in the QOS extended to running applications may be undesirable. Not only is the change in QOS undesirable, but the act of changing the precedence value involves engaging in an amount of over-the-air signaling between the mobile communication device and the cellular network.

SUMMARY INFORMATION

A solution is desired that avoids changes in QOS extended to running applications and that also reduces the amount of communication overhead involved in supporting the QOS mechanism.

In a first novel aspect, a group of precedence values can be ordered into a list of contiguous precedence values, where the list is made up of a number of blocks of precedence values. An operating system of a mobile communication device (for example, a cellular telephone) receives filters from an application executing on the mobile communication device. The filters received from the application have a precedence order specified by the application. The operating system assigns a precedence value to each filter, where the precedence values are taken from the block in the list that is available and has the highest priority. The precedence values of the block are assigned to the filters so as to maintain the precedence order specified by the application.

Once the assignment has been made, the filters and their precedence values are communicated from the mobile communication device to an entity that filters packets by applying the filters in the order of their precedence values. The entity may, for example, be a network router. The network router receives packets and attempts to match them to the filters, one filter at a time, in the order indicated by the assigned precedence values. If a packet is determined to match a filter, then the packet is forwarded from the network router to the mobile communication device across a communication channel associated with the filter. The communication channel typically has Quality of Service (QOS) characteristics desired by the application. If the packet is determined not to match any filter but is still destined for the mobile communication device, then the packet is forwarded to the mobile communication device across a default communication channel. The default communication channel typically does not have any guaranteed QOS characteristics. Accordingly, the precedence values assigned to filters of an application are taken from the same block, and there is one such block for each application that has presented filters to the operating system for precedence value assignment. Due to the block-based assignment of filter precedence values, filters for an application can be added, deleted, or modified without affecting the precedence values of other filters for other applications. If, for example, an application presents an additional filter for assignment, then the operating system assigns the additional filter the next highest priority precedence value in the block that corresponds to the application. If, for example, a filter for an application is to be deleted, then the precedence value in the block that corresponds to the application is no longer assigned, and the assignments in other blocks are not disrupted. Similarly, if a filter for an application is to be modified, then the modification is done without changing the precedence values of filters assigned out of other blocks.

In a second novel aspect, if an application presents filters to the operating system for precedence value assignment, and if the block of lowest priority in the list is not available and there is an unused block in the list, then a repacking operation may be performed to fill the unused block. Such an unused block may be called a "hole". In the repacking operation, filters that were previously assigned precedence values from one block are reassigned to have precedence values from another block. Assigned precedence values are therefore shifted on a block basis so that precedence values in the hole (the previously unused block) is filled and so that one or more unused blocks opens up at the bottom of the list (the low priority end of the list). In one embodiment, all holes in the list are filled in the repacking operation. In another embodiment, only the hole of lowest priority is filled, therefore reducing the amount of precedence value reassignment involved in the repacking operation.

After the repacking operation, one or more unused blocks are available at the bottom of the list (the low priority end of the list). Precedence values from the highest priority one of these blocks are assigned to the filters that were presented to the operating system by the application. Precedence information for filters whose precedence values are reassigned in the repacking is communicated to the filtering entity. The presented filters and their associated assigned precedence values are also communicated to the filtering entity. The filtering entity uses the filters and precedence information to apply all the associated filters in the precedence order. Due to the block by block shifting of the repacking operation, the precedence order of filters previously applied by the filtering entity is not changed by the repacking (even though the precedence values of various ones of the filters have been changed). The newly presented filters have precedence values assigned from the lowest available block of precedence values, and therefore have precedences that are lower than the precedences of all the previously applied filters.

In one advantageous aspect, if the repacking operation is performed such that only the hole of lowest priority is filled, then the amount of over-the-air signaling between mobile communication device and network router necessary to communicate the results of the reassignment is reduced. Moreover, the filling of other holes in the list and the associated over-the-air signaling may be avoided permanently if a time comes when no filter is being used. If no filter is being used, then all blocks in the list are available. If an application subsequently presents filters to the operating system for assignment, then the newly presented filters will be assigned precedence values from the highest priority block. Because the use of blocks will proceed block by block down the list from the highest priority block, the prior need for repacking is obviated, and the overhead of the associated over-the-air signaling need never be incurred.

In one embodiment, each application has a preassigned block of precedence filter values. Filters specified by an application are assigned precedence filter precedence values from the block. Accordingly, the order of launching applications does not affect the blocks assigned to the various applications. The order of launching applications therefore does not affect the precedence values of filters or the QOS extended to the various applications.

Additional embodiments and details are described in the detailed description below. This summary does not purport to define the invention. The invention is defined by the claims.

DETAILED DESCRIPTION

Figure 1:
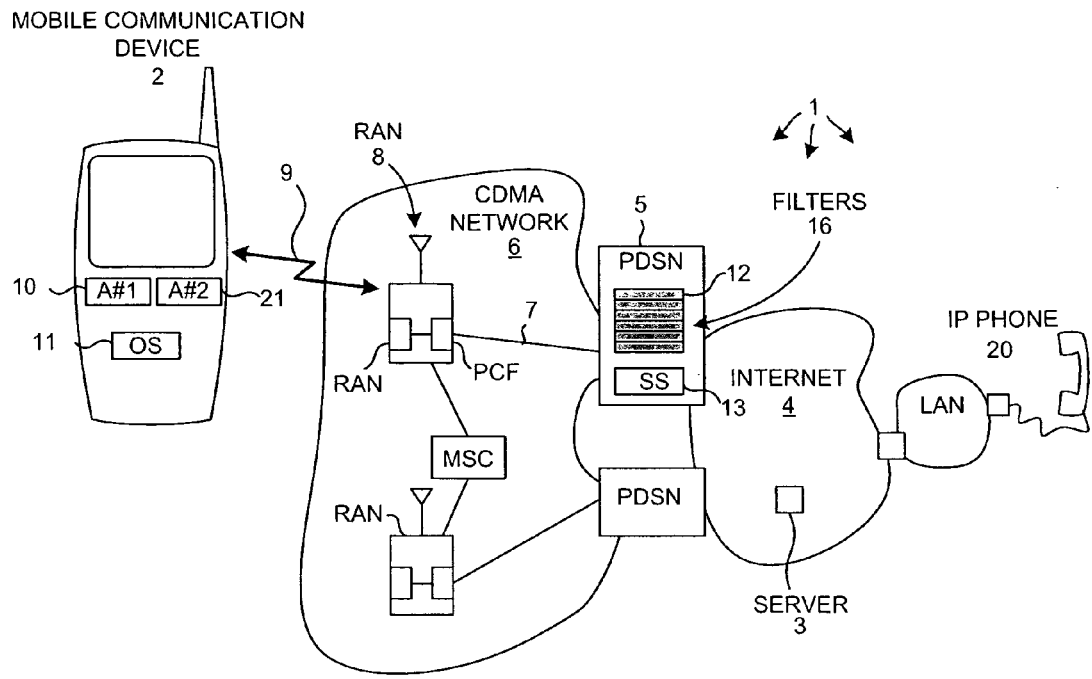
FIG. 1 is a simplified diagram of a system that employs a novel method of assigning precedence values to filters.

FIG. 1 is a simplified diagram of a system 1 in accordance with one novel embodiment. A mobile communication device 2 (in this case, a cellular telephone) is receiving streaming audio IP packets from a server 3 on the internet 4. The term "mobile station" is often used instead of the term "mobile communication device."

Figure 2:
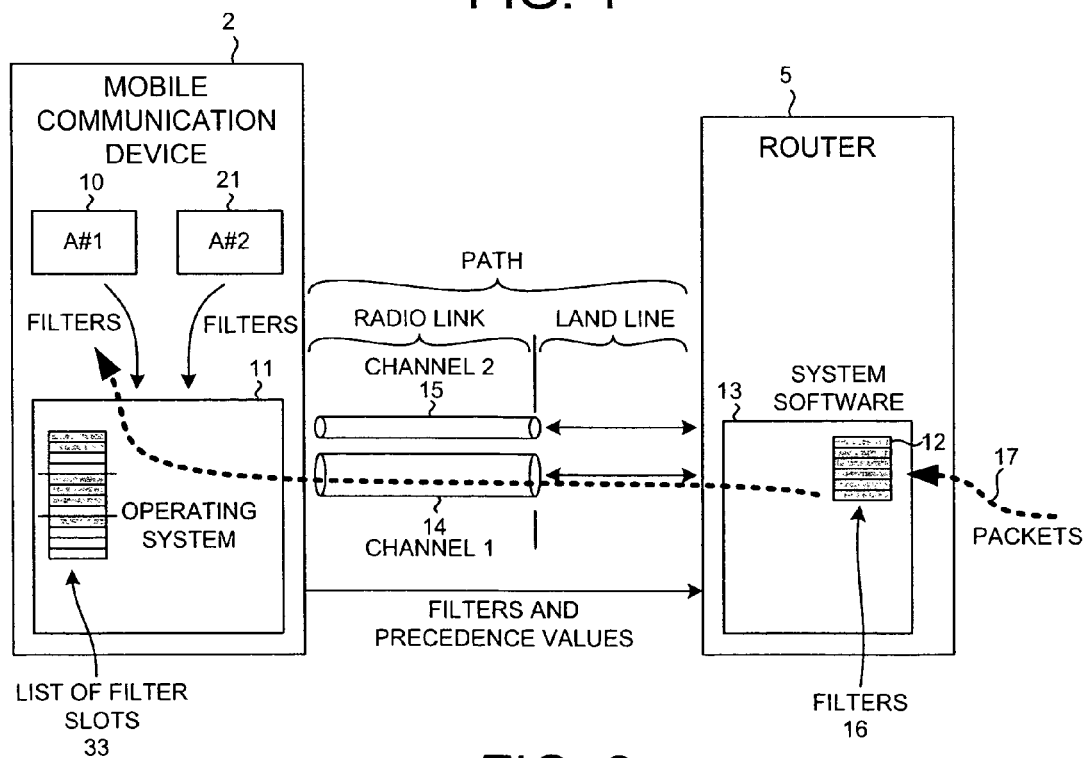
FIG. 2 is an expanded view of the mobile communication device and the network router of the system of FIG. 1.

The streaming audio IP packets pass from server 3, through the internet 4, through a PDSN (Packet Data Serving Node) network router 5, through a cellular telephone network 6 (in this case, a CDMA network) across a hardwired link 7 to a RAN (Radio Access Network) 8, across a wireless link 9, and to the mobile communication device 2. A streaming audio application program 10 is executing on an operating system (OS) 11 in mobile communication device 2. The audio content payloads of the IP packets are received by the streaming audio application 10 and are presented to the user in the form of music. To ensure adequate bandwidth and latency for the streaming audio packets, application 10 specifies a flow specification and a filter specification and supplies these specifications to operating system 11. The flow specification in the present example specifies a required maximum end-to-end latency, a minimum required data rate, a minimum flow rate, a maximum error rate, a traffic class value, and a traffic handling priority value. Although this example specifies multiple parameters, another example of a flow specification may only specify a subset of these parameters or may specify only a few of the parameters, or may specify just one parameter. The filter specification includes a filter 12 that defines a flow of packets that is to receive the QOS (Quality of Service) defined by the flow specification. Filter 12 is communicated from the application 10 to operating system 11, which in turn communicates the filter along with a precedence value (priority value) to system software 13 of the PDSN network router 5. System software 13 associates a communication channel with the filter. In one example, system software 13 receives the filter 12 and the flow specification. System software 13 then communicates across link 7 with RAN 8 to inquire of RAN 8 which one of multiple communication channels should be used. The communication channels are over-the-air wireless communication channels between RAN 8 and mobile communication device 2. In the illustrated example, a first communication channel 14 (FIG. 2) can communicate packets back to the mobile device with a larger data rate and a lower latency that a second communication channel 15 (Channel 2). Each channel is an RLP (Radio Link Protocol) instance. RAN 8 compares the requirements in the flow specification with the available channels, identifies an appropriate channel, and informs system software 13 in network router 5 of the identified channel. System software 13 binds the filter with the identified channel. In FIG. 2, filter 12 for the streaming audio application is illustrated in a list 16 of filters within network router 5.

FIG. 2 is an expanded view showing how the streaming audio application 10 in mobile communication device 2 supplies filter 12 to operating system 11. Operating system 11 assigns a precedence value to filter 12 and sends the filter, precedence value and flow specification to system software 13 of network router 5. System software 13 uses the flow specification to identify a channel that is appropriate for communicating packets back to the mobile device and binds this channel to filter 12. When incoming packets 17 are received onto network router 5, system software 13 matches the incoming packets 17 against the filter that has the highest priority (lowest precedence number). In the present example, this is filter 12. If an incoming packet matches filter 12, then network router 5 forwards the packet to mobile communication device 2 over the particular channel 14 that is associated with filter 12. In the present example, there is only one filter. Incoming packets that do not match this filter are forwarded to mobile communication device 2 over a default channel 15 (Channel 2) that does not have any QOS guarantees.

Figure 3:
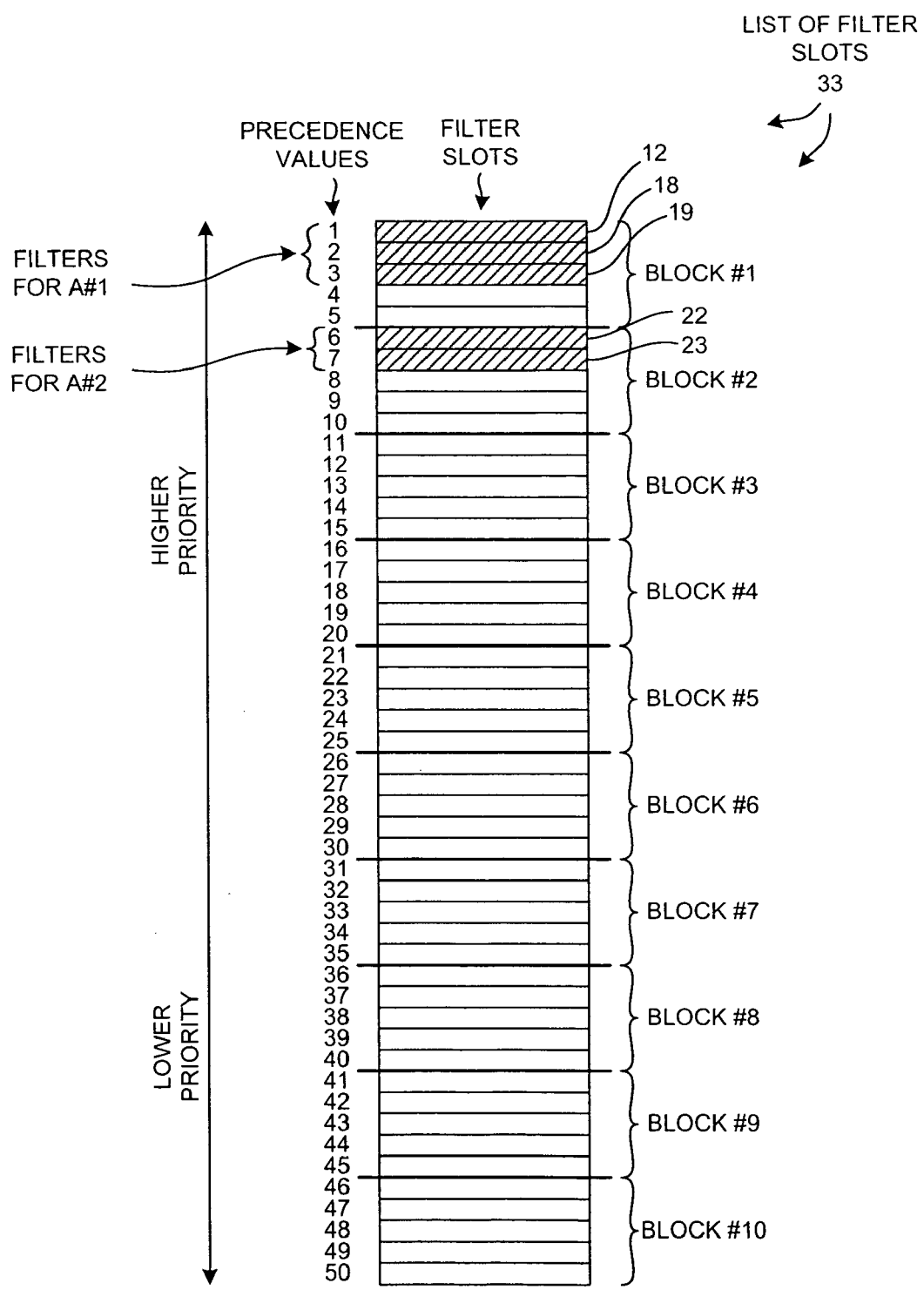
FIG. 3 is a view of a list of filter slots and a corresponding list of filter precedence values.

FIG. 3 is a diagram of a list of filter slots and a corresponding list of filter precedence values. The two lists are referred to as a "filter precedence list" 33. The list of contiguous filter precedence values is broken up into blocks of precedence values. Each block has an equal number of precedence values. There is a filter slot for each precedence value. If a filter is assigned to a slot in the list of filter slots, then the filter is assigned the precedence value of the slot. Filter precedence list 33 is maintained by operating system 11 in mobile device 2. The illustration is a virtual representation of the list 33 within operating system 11 that is used to assign precedence values to filters. Fifty available precedence filter slots are illustrated in a column. The precedence value for a filter slot is the value that appears in the diagram of FIG. 3 immediately to the left of the slot. The available fifty precedence values are divided by a predetermined maximum number of filters allowed to be used by an application. In the present example, an application can use up to five filters. The resulting quotient is a number of blocks of precedence values. In the illustrated example, there are ten blocks. Each block of five precedence values has a corresponding block of filter slots in the list of filter slots. The precedence value at the top of the list of precedence values (precedence value 1) is the highest priority precedence value. The precedence value at the bottom of the list of precedence values (precedence value 50) is the lowest priority precedence value. The filter slot at the top of the column of filter slots has the highest priority. The filter slot at the bottom of the column of filter slots has the lowest priority. If a filter is assigned to a slot, then the slot is illustrated as a dashed box. If no filter is assigned to a slot then the slot is illustrated as a blank box.

Figure 4:
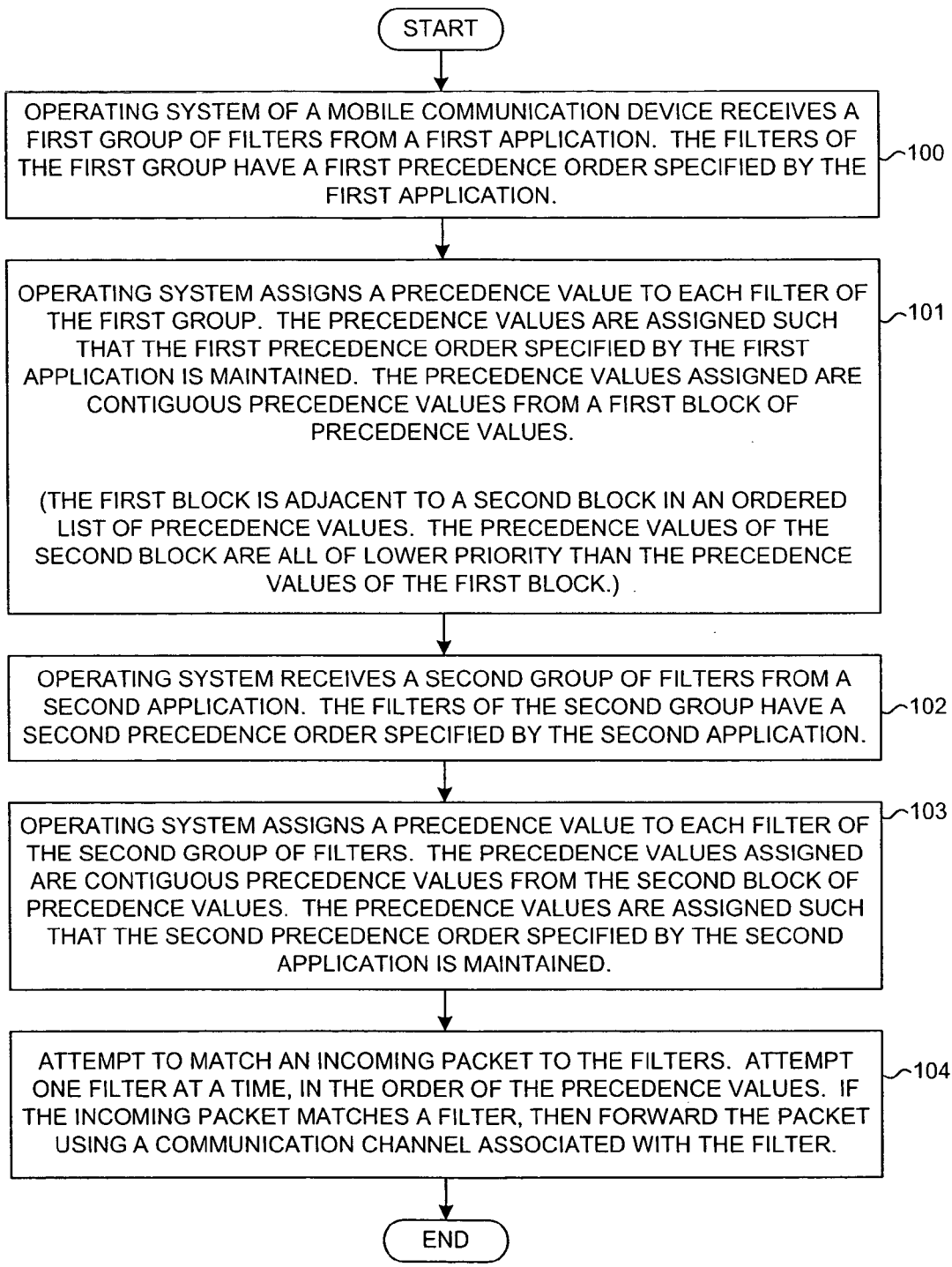
FIG. 4 is a flowchart representation involved in using the lists of FIG. 3 to assign precedence values to filters in one example of an operation of system 1 of FIG. 1.

FIG. 4 is a flowchart representation of a novel method that uses the filter precedence list 33 of FIG. 3 to assign precedence values to filters in one operating example of system 1 of FIGS. 1 and 2. In the operating example, streaming audio application 10 (see FIG. 2) specifies two filters, filters 18 and 19, in addition to filter 12. These three filters 12, 18 and 19 make up a first group of filters specified by application 10. Application 10 assigns each filter of this first group a precedence with respect to the other filters of the first group and supplies this first group of filters to operating system 11.

Operating system 11 receives (100 of FIG. 4) the first group of filters from the first application. The filters of the first group have a precedence order specified by the first application 10. Filter 12 has the highest priority, then filter 18, then filter 19. In one embodiment, the order in which the filters are communicated from first application 20 to operating system 11 indicates their relative precedences to operating system 11.

Operating system 11 assigns (101 of FIG. 4) a precedence value to each filter of the first group of filters. Operating system 11 does this by assigning the three filters 12, 18 and 19 to the first three slots (precedence slots 1, 2 and 3) in the first block (Block #1) of the filter precedence list 33 of FIG. 3. At this point in the present example, there are no other filters in filter precedence list 33. The filters and their precedence values are forwarded to network router 5. When an incoming packet (an Rx packet) is received onto network router 5, system software 13 attempts to match the packet to the highest priority filter 12. If there is a match, then the packet is determined to be for a flow destined for the streaming audio application. According to the association stored in system software 13, the packet is sent across the designated channel 14 to mobile communication device 2. The protocol processing stack in operating system 11 forwards the payload of the packet up to application 10. If there is no match, then system software 13 attempts to match the packet to the next highest priority filter 18. If there is a match, then the packet is determined to be for a flow destined for the streaming audio application. In the present operational example, the association stored in system software 13 indicates that packets that match the second filter 18 are also to be communicated across channel 14. If there is no match, then system software 13 attempts to match the packet to the next highest priority filter 19. If there is a match, then the packet is determined to be for a flow destined for the streaming audio application. As defined by the association stored in system software 13, the packet is sent across channel 14 back to mobile communication device 2. If the packet does not match any of filters 12, 18 and 19, then the packet is forwarded to mobile communication device 2 using the default channel 15. Accordingly, packets that match any one of the filters 12, 18 and 19 specified by the first application 10 are communicated to mobile communication device 2 across a communication channel 14 that has the desired QOS data rate and latency. Packets that do not match any one of the filters 12, 18 and 19 are deemed not to require the higher level of QOS afforded by channel 14 and therefore are communicated to mobile communication device 2 via the lower QOS default channel 15.

In the presently described operational example, the user of mobile communication device 2 next wishes to receive a mobile IP telephone call from an IP phone 20. The user may click on a mobile IP icon that appears on the screen of mobile communication device 2, thereby launching a mobile IP telephony application 21 (a second application). Second application 21 in the present operational example defines a flow specification and a filter specification to operating system 11. The filter specification includes two filters 22 and 23. Second application 21 assigns relative priorities to the two filters and supplies these filters to operating system 11 in a filter specification as explained above.

Operating system 11 receives (102 of FIG. 4) the second group of filters from second application 21. The filters of the second group have a second precedence order specified by second application 21.

Operating system 11 assigns (103 of FIG. 4) a precedence value to each filter of the second group of filters without changing the relative precedences of these filters 22 and 23 with respect to one another. To make the assignment, operating system 11 places the filters 22 and 23 in the filter slots in the next available block in filter precedence list 33. Because the second application 21 making the QOS request is the next application after application 10 to make a QOS request, the filters 22 and 23 are inserted into slots in the second block (Block #2) of the filter precedence list 33 of FIG. 3. It is therefore seen that filter blocks are used in a first come first serve (FCFS) scheme. FIG. 3 shows the two filters 22 and 23 occupying the first two filter slots in block #2. Filter 22 was therefore assigned a precedence value of 6, and filter 23 was assigned a precedence value of 7.

Once the precedence values are assigned, operating system 11 sends the filters 22 and 23, their assigned precedences (precedence 6 and precedence 7), and the flow specification to network router 5. System software 13 in network router 5 determines a communication channel for each filter and stores an identifier of the communication channel in association with the filter in list 16.

System software 13 on network router 5 attempts to match (104 of FIG. 4) subsequent incoming IP packets to the filters in list 16 in the order of the precedence values of the filters: precedence 1, precedence 2, precedence 3, precedence 6, precedence 7. The filter having the lowest precedence value is the highest priority filter and is tried first, then the filter having the next lowest precedence value is tried next, and so forth through all the filters in the filter list. If IP telephony packets are received onto network router 5 and do not match one of the filters 12, 18 and 19 for the streaming audio application 10 but rather match one of the filters 22 and 23 for the IP telephony application 21, then the packets are sent to mobile communication device 2 by the communication channel designated. The protocol stack in operating system 11 forwards the packet payloads up to application 21. In this way, the IP packets destined for IP telephony application 21 are communicated from router 5 to mobile communication device 2 using the desired level of QOS due to their being communicated across a communication channel having the requested QOS characteristics. Similarly, IP packets destined for audio streaming application 10 are communicated from router 5 to mobile communication device 2 using the desired level of QOS due to their being communicated across a communication channel having the requested QOS characteristics.

When an application is launched on mobile communication device 2, the filters specified are inserted into filter precedence list 33 of FIG. 3 into the next available block of filter slots. The relative precedences of the filters assigned by the application are maintained, but operating system 11 inserts the filters into the next block of filter slots. All of the newly added filters therefore have higher precedence values (lower priorities) than filters already placed in the precedence list of FIG. 3 by other applications. As applications are launched over time, blocks having higher and higher precedence values (lower and lower priorities) are used. In the example of FIG. 3, blocks lower and lower in the column are used.

After an application has been running for a period of time, the application can add one or more new filters to its filter specification provided that there is an adequate number of spare filter slots in the block of filter slots assigned to the application. The application can also modify or delete one or more already existing filters in its filter specification. To add a filter, operating system 11 inserts the new filters into the spare slots in the block already being used by filters for the application, determines the precedence values for the inserted filters, and then sends the filters, their associated precedence values, and the flow specification to network router 5. Because the newly added filter is inserted into the next filter slot in the block of filter slots for the application, the newly added filter does not affect the precedence values of other filters that are in use. Because the modifying or deleting of an existing filter only affects that filter's filter slot, the modifying or deleting does not affect the precedences of any other filters. System software 13 on network router 5 goes through the process of identifying an appropriate communication channel. Network router 5 then applies the filters in the order of their precedence values. If an incoming packet is determined to match a filter, then the packet is sent to the mobile communication device 2 across the associated communication channel.

When an application shuts down, operating system 11 in mobile communication device 2 deletes the associated filters from its filter precedence list and sends one or more filter update messages to network router 5. The form of the filter update message varies depending on the type of wireless network. The result of the filter update message is to cause system software 13 to delete the filters and not to apply them to incoming packets. Accordingly, as applications are shut down over time, blank blocks of filters (called holes) may develop in the filter precedence list 33 maintained by operating system 11. Certain blocks of filters may be deleted, where there are higher precedence filter blocks that are used and where there are lower precedence filter blocks that are used.

Figure 5:
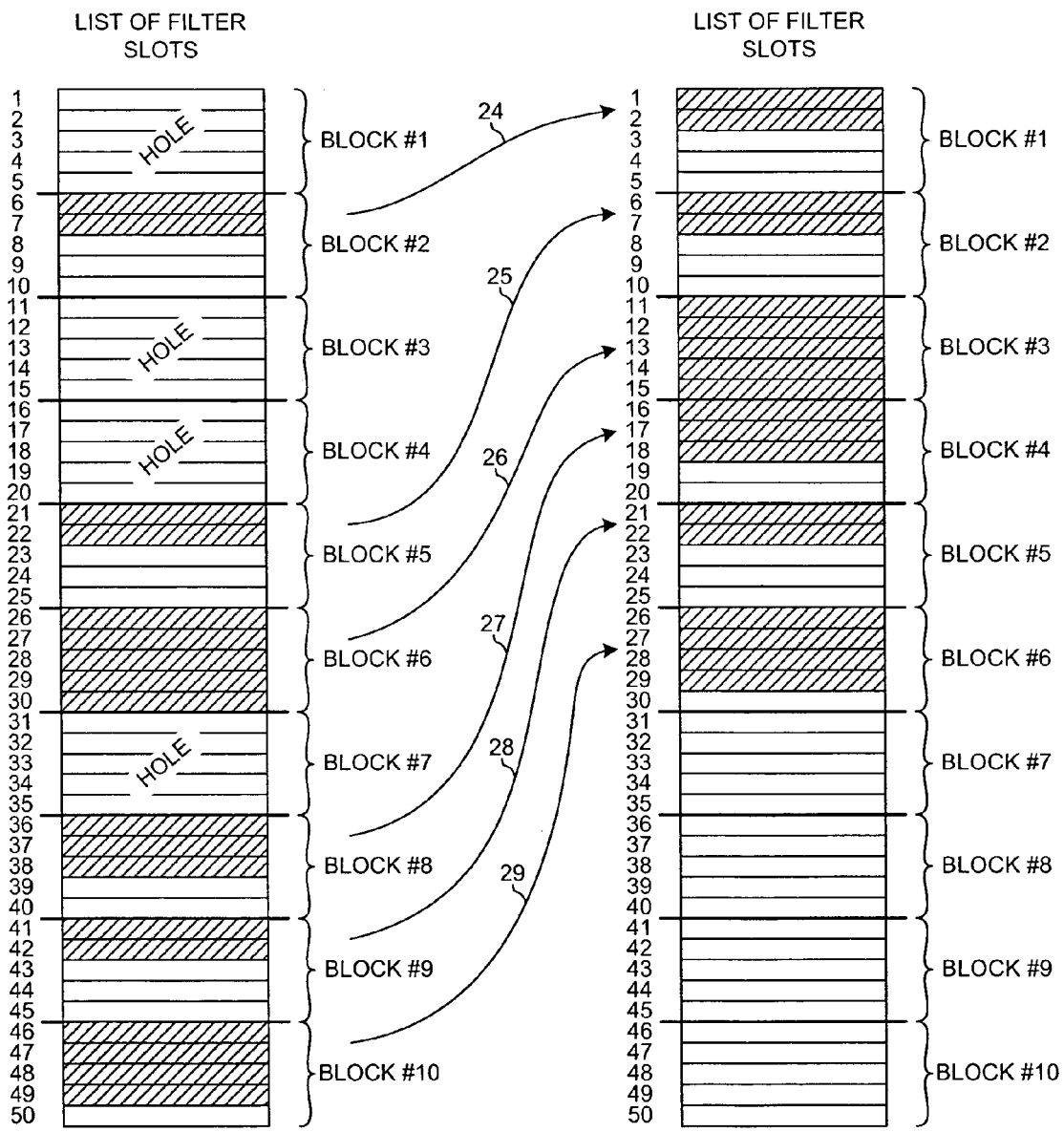
FIG. 5 is a diagram of a first repacking operation usable to reassign precedence values in accordance with one embodiment.

FIG. 5 illustrates two lists of filter slots (also called precedence filter lists), one in a column on the left and one in a column on the right. The list in the left column includes numerous holes. Blocks #1, #3, #4 and #7 are holes. Also note that the precedence filter block with the higher precedence values (lower priority), block #10, is being used. If another application were to be launched on mobile communication device 2 that were to make a QOS request, then the filters specified by that application could not be placed into a precedence filter block having a higher precedence value (a lower block in the list illustrated in FIG. 4) because the bottom-most filter block is already used. A novel repacking operation is therefore performed.

FIG. 5 illustrates one example of a repacking operation. The arrows between the two columns of filter slot lists in the illustration of FIG. 5 show how the blocks are reassigned. As indicated by arrow 24, the filters of block #2 are reassigned to be the filters of block #1. As indicated by arrow 25, the filters of block #5 are reassigned to be the filters of block #2. As indicated by arrow 26, the filters of block #6 are reassigned to be the filters of block #3. As indicated by arrow 27, the filters of block #8 are reassigned to be the filters of block #4. As indicated by arrow 28, the filters of block #9 are reassigned to be the filters of block #5. As indicated by arrow 29, the filters of block #10 are reassigned to be the filters of block #6. After the repacking operation, there are no holes in the sequence of blocks one through five in the precedence list illustrated on the left in the diagram. Blocks seven through ten are, however, available. Operating system 11 within mobile communication device 2 performs the remapping. For each filter that is remapped, operating system 11 sends a QOS modify request using the proprietary signaling protocol to network router 5. This QOS modify request is a similar message to the message that was used to specify the filter initially. The QOS modify request changes the precedence value for the identified filter.

Once the repacking has been completed, the new filters for the newly launched application can be assigned to available block #7. Again, the proprietary signaling protocol is used to send the filters to network router 5 along with associated precedence values. The precedence value for a filter is the value that appears in the diagram of FIG. 5 immediately to the left of the dashed box that represents the filter in the list of filters. If, for example, two new filters are specified, then these two new filters will have precedence values of 31 and 32.

Figure 6:
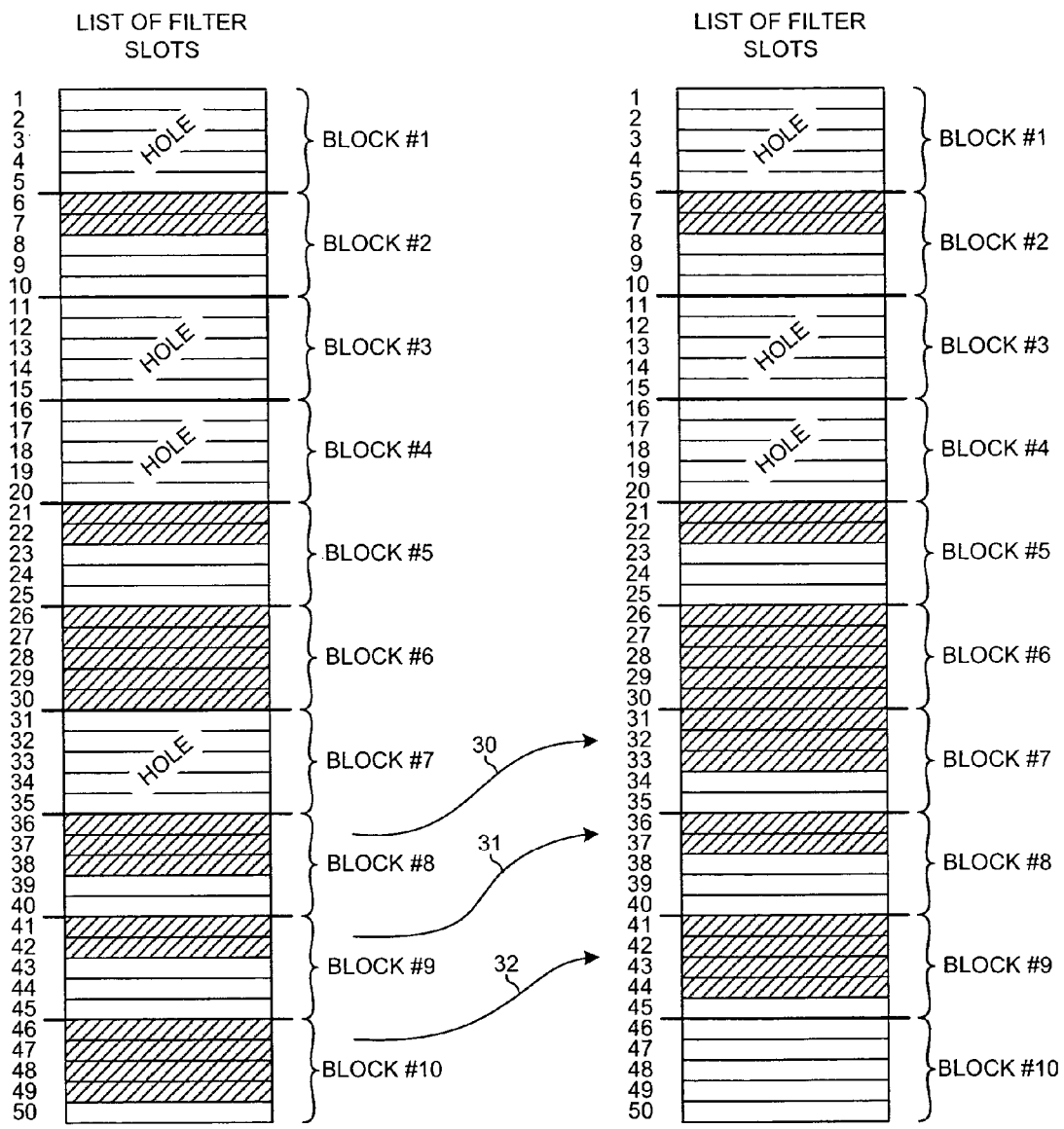
FIG. 6 is a diagram of a second repacking operation usable to reassign precedence values in accordance with another embodiment.

FIG. 6 is a diagram in accordance with another novel repacking operation. Rather than repacking to remove all holes in the precedence filter list, only the hole having the highest precedence values is filled. In the example of FIG. 6, block #7 is this hole. Accordingly, the filters of block #8 are reassigned to block #7 as indicated by arrow 30. The filters of block #9 are reassigned to block #8 as indicated by arrow 31. The filters of block #10 are reassigned to block #9 as indicated by arrow 32. Block #10 is thereby made available. Operating system 11 loads the filters for the newly launched application into block #10. By reassigning only the filters necessary to fill the bottom-most hole and to shift up lower blocks of filters, a reduced number of filter QOS modify request messages are required. A reduced number of QOS modify request messages can therefore be sent from mobile communication device 2 to router 5 in order to open up a block of filters in the precedence list to accommodate new filters specified by the newly launched application. Reducing the number of QOS modify request messages is desirable because it may reduce the amount of over the air signaling to do the reassignment and reduce the disruption of service to other applications.

If all applications on mobile communication device 2 are shut down at one given time, then all the blocks in the filter precedence list of FIG. 3 will be made available at one time. If an application is then launched, the process of putting filters into the precedence list starts with Block #1. By delaying the repacking of the precedence list as much as possible in the example of FIG. 6, the probability is increased that a time will come when all applications on the mobile communication device will be shut down. Accordingly, the probability that a reassignment of filters from one block to another will be necessary is also reduced.

Although an example of a precedence filter list is explained above for applying filters to incoming packets that are to be received onto network router 5 destined for mobile communication device 2, another precedence filter list is maintained in mobile communication device 2 for use in applying filters to outgoing packets that are to be transmitted out of mobile communication device 2 to router 5. Filters are added to and deleted from the filter list for filtering outgoing packets in the same way that filters are added to and deleted from the filter list set forth above for filtering incoming packets. For each direction (incoming and outgoing), a flow specification and a filter specification is specified where the flow specification defines the treatment required for an IP flow while the filter specification defines the IP flow itself.

Although certain specific embodiments are described above for instructional purposes, the present disclosure is not limited thereto. The example above describes a situation where an application adds another filter into its block of filter slots, but the application can also delete a filter from the block and/or modify existing filters in the block (thus maintaining the same number of filters). A modification does not result in a change of the precedences of other filters and therefore may reduce signaling overhead and avoid disruption of other applications. The particular protocol and signaling mechanism employed for changing the precedence of a filter, for adding a filter, and for deleting a filter may depend upon the type of cellular telephone network involved and the pertinent standards that control how such operations are to be performed. In some cellular telephone networks, the precedence value of a first filter can be changed by deleting the first filter using a first message and then using a second message to add a second filter identical to the first filter but having a different precedence value. Alternatively, in some cellular telephone networks, the precedence value of a filter can be changed by sending a single message. In some examples, a network router determines a channel for association with a filter by receiving a flow specification, communicating with a RAN, and then receiving back from the RAN an indication of a channel that has the desired QOS parameters of the flow specification. In other examples, a network router does not receive the flow specification, rather the flow specification is sent directly to the RAN. The RAN determines an appropriate channel and forwards an indication of this channel to the network router. The network router in turn associates the identified channel with the filter that was received directly from the mobile communication device. Accordingly, various modifications, adaptations, and combinations of the various features of the described specific embodiments can be practiced without departing from the scope of the disclosure as set forth in the claims.

What is claimed is:

1. A method for use in a mobile computing platform to assign precedence values from a group of precedence values, the group of precedence values being orderable into a contiguous ordered list, wherein the contiguous ordered list can be broken up into a plurality of blocks, each of the blocks including an equal number of precedence values, the method comprising:

with a processor executing programmed instructions comprising:
(a) obtaining a first group of filters associated with a first application, wherein the filters of the first group have a first precedence order specified by the first application;
(b) assigning precedence values to filters of the first group of filters, wherein the precedence values assigned to the filters of the first group of filters comprise contiguous precedence values from a first one of the blocks, and wherein the precedence values are assigned such that the first precedence order specified by the first application is maintained;
(c) obtaining a second group of filters associated with a second application, wherein the filters of the second group have a second precedence order specified by the second application;
(d) assigning precedence values to filters of the second group of filters, wherein the precedence values assigned to the filters of the second group of filters comprise contiguous precedence values from a second one of the blocks, and wherein the precedence values are assigned such that the second precedence order specified by the second application is maintained, wherein the second one of the blocks is magically adjacent to the first one of the blocks in the ordered list, and wherein the precedence values of the second block are all of lower priority that the precedence values of the first block; and
(e) selectively performing a repacking operation to reassign precedence values of the first one of the blocks to the second group of filters previously assigned precedence values from the second one of the blocks.

2. The method of claim 1, wherein the first group of filters comprises fewer filters than there are precedence values in the first one of the blocks of precedence values.

3. The method of claim 2, further comprising:
providing the precedence values assigned in at least one of (b), (d), or (e) to a network router for use by the network router in filtering packets to the mobile computing platform.

4. The method of claim 3, wherein the network router is adapted to store an association between the filters in the first group of filters and a corresponding communication channel, and wherein the network router is adapted to use the first group of filters to filter packets by:
(a) determining whether a packet matches a first filter in the first group of filters, the first filter being the filter in the first group having a highest priority, and if the packet is determined to match the first filter then communicating the packet to the mobile computing platform across a communication channel that is associated with the first filter;
(b) if the packet has not yet been determined to match any filter in the first group of filters and if there is another filter in the first group of filters, then determining whether the packet matches a next filter in the first group of filters, where the next filter is the filter in the first group of filters having a next highest priority, and if the packet is determined to match the next filter then communicating the packet to the mobile computing platform across a communication channel that is associated with the next filter; and (c) repeating (b) until either the packet is determined to match a filter in the first group of filters, or until there is not another filter in the first group to which the packet could be matched.

5. The method of claim 4, further comprising:
determining whether the packet matches any filter in the network router that has an assigned precedence value and if it is determined that the packet does not match any filter in the network router that has an assigned precedence value then communicating the packet to the mobile computing platform across a default communication channel.

6. The method of claim 1, wherein the first precedence order is specified by the first application by an order in which the filters of the first group of filters is communicated to an operating system.

7. The method of claim 1, wherein (a), (b), (c) and (d) are performed by an operating system of a mobile computing platform, and wherein the first application and the second application are applications that execute in conjunction with the operating system on the mobile computing platform.

8. The method of claim 7, wherein the plurality of blocks further includes a third block and a fourth block, wherein no filter has a precedence value that is assigned a precedence value from the third block, and wherein the operating system has assigned a set of precedence values from the fourth block to a set of filters, wherein the third and fourth blocks are adjacent one another and wherein the precedence values of the third block are all of higher priority than the precedence values of the fourth block, and wherein (e) further comprises:
reassigning precedence values to the set of filters such that each filter of the set is assigned a precedence value from the third block and is no longer assigned a precedence value from the fourth block.

9. The method of claim 8, further comprising:
(f) communicating the precedence values assigned in (e) from the mobile communication device to a network router; and
(g) using the set of filters on the network router to filter packets.

10. The method of claim 8, wherein one of the blocks of the plurality of blocks is a lowest priority block, and wherein (e) is selectively performed if a filter is assigned a precedence value from the lowest priority block.

11. The method of claim 7, wherein prior to a repacking operation there is a set of occupied blocks and a set of unoccupied blocks, an occupied block being a block for which a filter has been assigned a precedence value from the block, an unoccupied block being a block for which no filter has been assigned a precedence value from the block, wherein one of the occupied blocks is a block of higher priority than any of the unoccupied blocks, the wherein (e) further comprises:
reassigning precedence values to filters assigned to the occupied blocks such that the filter is no longer assigned a precedence value from the occupied block but rather is assigned a precedence value from a corresponding higher priority block, wherein the repacking operation results in a packed set of occupied blocks, there being no unoccupied block after the repacking operation that has a higher priority than the lowest priority occupied block of the packed set of occupied blocks.

12. The method of claim 1, further comprising:
using the precedence values assigned in at least one of (b), (d), or (e) to filter packets transmitted to a network from the mobile computing platform.

13. The method of claim 1, wherein each of a plurality of applications is associated with a different one of the blocks in the ordered list, and wherein filters associated with each of the plurality of applications are assigned precedence values regardless of an order in which applications in the plurality of applications are launched and/or shut down.

14. A mobile communication device, comprising:
a mobile computer platform having a processor programmed with processor-executable instructions comprising at least:
a first application to supply a first group of filters and specify a first precedence order for the filters of the first group;
a second application to supply a second group of filters and specify a second precedence order for the filters of the second group;
an operating system executing in conjunction with at least the first and second applications to:
obtain the first group of filters and assign a precedence value to filters of the first group, wherein the precedence values assigned to the filters of the first group are contiguous precedence values from a first block of precedence values, and wherein the precedence values are assigned such that the first precedence order specified by the first application is maintained, and
obtain the second group of filters and assign a precedence value to filters of the second group, wherein the precedence values assigned to the filters of the second group are contiguous precedence values from a second block of precedence values, wherein a plurality of contiguous precedence values are capable of being grouped into a plurality of blocks such that the first and second blocks are two logically adjacent blocks in the plurality of blocks; and
selectively perform a repacking operation to reassign precedence values of the first block to the second group of filters previously assigned precedence values from the second block.

15. The mobile communication device of claim 14, wherein the operating system communicates the filters of the first group and the filters of the second group to a network router.

16. The mobile communication device of claim 14, wherein the operation system communicates the precedence values assigned to the filters of the first group and the precedence values assigned to the filters of the second group to a network router.

17. The mobile communication device of claim 14, wherein there are more precedence values in the first block of precedence values than there are filters in the first group of filters, wherein there are more precedence values in the second block of precedence values than there are filters in the second group of filters.

18. A mobile communication device, comprising:
means for storing one or more digital signals representing a first group of filters, the first application specifying a first precedence order for the filters of the first group, and one or more digital signals representing a second group of filters, the second application specifying a second precedence order for the filters of the second group;

means for assigning a precedence value to filters of the first group, wherein the precedence values assigned to the filters of the first group are contiguous precedence values from a first block of precedence values, and wherein the precedence values are assigned such that the first precedence order is maintained, the means also being for assigning a precedence value to filters of the second group, wherein the precedence values assigned to the filters of the second group are contiguous precedence values from a second block of precedence values, wherein a plurality of contiguous precedence values are capable of being grouped into a plurality of blocks such that the first and second blocks are two adjacent blocks in the plurality of blocks, and the means also being for selectively performing a repacking operation to reassign precedence values of the first block to the second group of filters previously assigned precedence values from the second block; and wherein the means for storing is also for storing one or more digital signals representing the assigned and/or reassigned precedence values.

19. The mobile communication device of claim 18, further comprising:

means for communicating one or more digital signals representing the filters of the first group and the filters of the second group to a network router, wherein there are more precedence values in the first block of precedence values than there are filters in the first group of filters.

20. An article comprising:

a processor-readable medium having stored thereon a set of processor-executable instructions, which if executed by a processor in a mobile computer platform, enable the mobile computing platform to:

(a) obtain a plurality of filters associated with an application executing on the processor and assign precedence values to the filters on a block basis such that the filters received are assigned precedence values from a corresponding one and only one of the blocks of precedence values, wherein there may be fewer filters than there are precedence values in the corresponding block of precedence values;

(b) communicate the filters obtained in (a) along with indications of filter precedences to a network device;

(c) obtain first packets that matched at least one of the filters communicated in (b) and forward information in the first packets to the application;

(d) repeat (a) such that second filters are obtained which are associated with a second application executing on the processor and are assigned precedence values from a second one of the blocks of precedence values; and (e) communicate the filters received in (d) along with indications of filter precedences to the network device;

(f) obtain second packets that matched at least one of the filters communicated in (e) and forward information in the second packets to the second application: and (g) selectively perform a repacking operation to reassign precedence values to filters such that filters that were assigned precedence values from a lower level block are reassigned to have precedence values from a higher level block, wherein the precedence values of the higher level block are all of higher priority than the precedence values of the lower level block.

21. The article of claim 20, wherein (a) through (g) are performed as part of an operating system executing on the processor.

22. The article of claim 21, wherein (g) comprises reassigning precedence values to filters such that filters that were assigned precedence values from a fourth block are reassigned to have precedence values from a third block, wherein the precedence values of the third block are all of higher priority than the precedence values of the fourth block.

23. The article of claim 22, wherein the set of processor-executable instructions, if executed by the processor, enable the mobile computing platform to:

(h) communicate to the network device indications of filter precedences, wherein the filter precedences are for the filters that were reassigned precedence values in (g).

* * * * *